United States Patent
Batlaw et al.

[11] Patent Number: 5,429,841
[45] Date of Patent: Jul. 4, 1995

[54] PRINTING INK EMULSION WITH POLY(OXYALKYLENE) SUBSTITUTED COLORANT

[75] Inventors: Rajnish Batlaw, Spartanburg; Patrick D. Moore, Pacolet, both of S.C.

[73] Assignee: Milliken Research Corporation, Spartanburg, S.C.

[21] Appl. No.: 229,483

[22] Filed: Apr. 19, 1994

Related U.S. Application Data

[63] Continuation-in-part of Ser. No. 184,610, Jan. 21, 1994, which is a continuation-in-part of Ser. No. 83,737, Jun. 25, 1993, Pat. No. 5,389,310.

[51] Int. Cl.$^6$ .............................................. B05D 1/40
[52] U.S. Cl. ................... 427/288; 427/428; 106/230
[58] Field of Search ............. 427/288, 428; 106/28 R, 106/22 R, 23 R, 23 D, 32

[56] References Cited

U.S. PATENT DOCUMENTS

| | | | |
|---|---|---|---|
| 3,694,238 | 9/1972 | Tinghitella et al. | 106/30 |
| 3,825,431 | 7/1974 | Uhl et al. | 106/20 |
| 3,948,668 | 4/1976 | Hayek et al. | 106/22 |
| 4,104,219 | 8/1978 | Peters et al. | 260/29.6 |
| 4,253,397 | 3/1981 | Emmons et al. | 101/450.1 |
| 4,255,196 | 3/1981 | Emmons et al. | 106/29 |
| 4,402,262 | 9/1983 | Handforth | 101/129 |
| 4,543,102 | 9/1985 | Defago et al. | 8/471 |
| 4,692,188 | 9/1987 | Ober et al. | 106/23 |
| 4,840,674 | 6/1989 | Schwarz | 106/22 |
| 4,963,188 | 10/1990 | Parker | 106/20 |
| 4,981,517 | 1/1991 | DeSanto, Jr. et al. | 106/28 |
| 5,062,894 | 11/1991 | Schwartz et al. | 106/23 |
| 5,098,478 | 3/1992 | Krishnan et al. | 106/23 |
| 5,104,449 | 4/1992 | Pavlin | 106/30 R |
| 5,145,997 | 9/1992 | Schwartz et al. | 564/158 |
| 5,158,606 | 10/1992 | Carlick et al. | 524/145 |
| 5,176,745 | 1/1993 | Moore et al. | 106/22 R |

FOREIGN PATENT DOCUMENTS

| | | |
|---|---|---|
| 63-264674 | 4/1987 | Japan . |
| 4-288375 | 10/1992 | Japan . |

*Primary Examiner*—Shrive Beck
*Assistant Examiner*—Erma Cameron
*Attorney, Agent, or Firm*—Terry T. Moyer; Timothy J. Monahan

[57] ABSTRACT

An ink composition for Gravure printing is provided with a poly(oxyalkylene) substituted colorant and a vehicle which is a water-in-oil emulsion of a water immiscible organic phase and an aqueous phase, in the range of 9:1 to 1:1, thereby significantly reducing VOC emissions, with no detrimental effect on print quality.

16 Claims, 1 Drawing Sheet

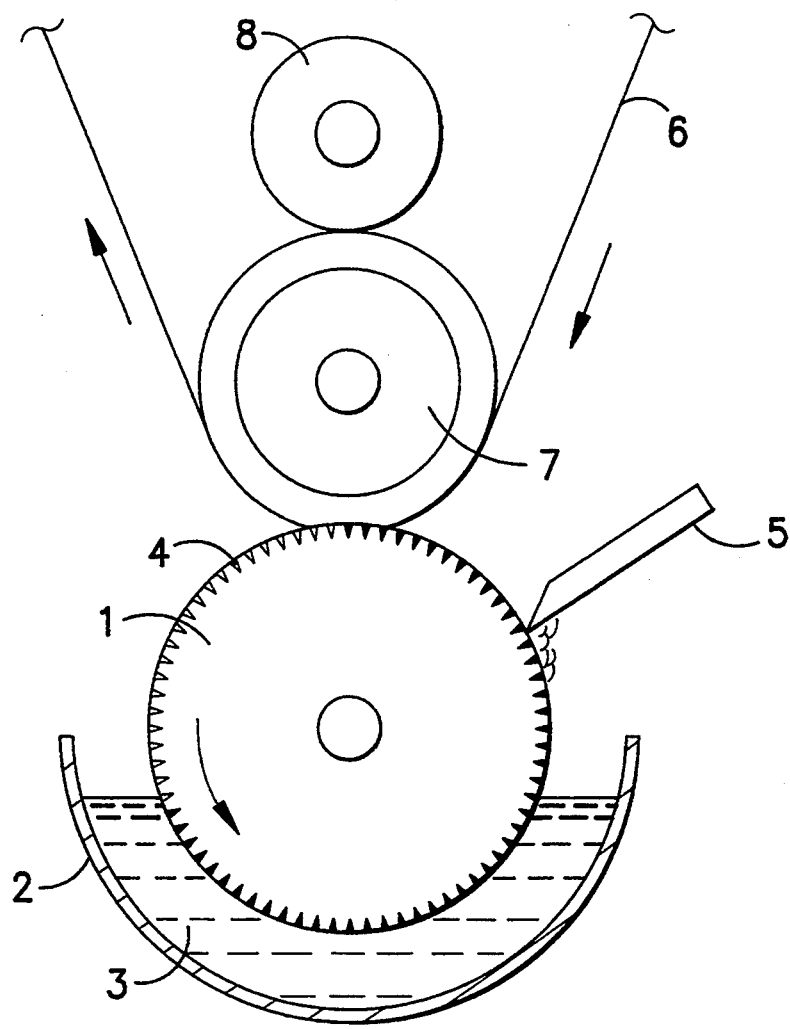
FIG. -1-

PRINTING INK EMULSION WITH POLY(OXYALKYLENE) SUBSTITUTED COLORANT

This application is a continuation-in-part of application Ser. No. 08/184,610, filed Jan. 21, 1994, entitled Printing Ink Emulsion With Poly(oxyalkylene) Substituted Colorant, which is a continuation-in-part of application Ser. No. 08/083,737, filed Jun. 25, 1993, now U.S. Pat. No. 5,389,310 entitled Printing Ink Emulsion Having Reduced VOC, specific mention being made herein to obtain the benefit of their earlier filing dates.

BACKGROUND OF THE INVENTION

This invention relates to a printing ink suitable for publication gravure printing having a substantial portion of organic solvent replaced with water, the physical form of the ink being an organic solvent and water emulsion. A poly(oxyalkylene) substituted colorant is provided in the ink emulsion.

Inks consist of a colorant and a liquid vehicle, in which the colorant is dispersed or dissolved. After the ink is applied, a binder present in the vehicle adheres the colorant to the substrate on which it is printed. The binder may be a drying oil which oxidizes and is converted from a liquid to a solid film, or a resin dissolved or dispersed in a solvent, which forms a solid film binding the colorant to a substrate after the solvent is evaporated. Combinations of drying oils, resins and organic solvents are also employed.

The solvents used in gravure printing are primarily aromatic, aliphatic and naphthenic hydrocarbons. Additional organic solvents useful in gravure printing include alcohols, ketones, esters, ethers and halogenated compounds. Important criteria in solvent selection are solvent strength relative to a desired resin, evaporation rate, viscosity, cost, odor and toxicity, and compatibility with the substrate to be printed upon. Occasionally, small amounts of water, less than 5 wt. %, usually about 2 wt. %, are added to gravure inks to overcome printing problems.

Since the solvent typically constitutes from 30 to 70 wt. % of a gravure ink composition, the emission of volatile organic compounds (VOC) represents a significant environmental concern. In order to comply with myriad federal, state and local environmental regulations, gravure printers have been required to install solvent recovery systems. The systems represent both a substantial capital outlay and operating expense, and can limit production rates. Losses of organic solvent to the atmosphere also represent raw material make up expense.

Water based inks have been developed to avoid the environmental impact and operating expenses associated with organic solvents and, in some cases, reduce raw material costs. Water dispersible or soluble binders, such as polyacrylic acid and polymethacrylic acid, may be employed, as well as water miscible co-solvents. In Peters et al., U.S. Pat. No. 4,104,219, a polyalkyl acrylate binder is dispersed in a homogenous, aqueous phase. Defago et al., U.S. Pat. No. 4,543,102, disclose an aqueous ink composition having up to 8% of a water miscible organic solvent, which contains polyvinyl alcohol and an acrylic polymer or copolymer.

A method of preparing an aqueous ink for ink jet printing is described in Ober et al., U.S. Pat. No. 4,692,188, comprising the steps of:

1. dissolving a polymer, such as polystyrene or polyester, and an oil soluble dye in a water immiscible solvent, such as methylene chloride;
2. adding an aqueous phase and a surfactant;
3. forming an emulsion; and
4. evaporating the solvent to form an ink having particles of polymer and dye suspended in the aqueous phase.

All of the water immiscible organic solvent is removed prior to application of the ink to a substrate.

There are a number of drawbacks associated with water-base inks. The press handling characteristics of water-base inks are uniquely different from organic solvent base materials. Once dry, aqueous inks may be reluctant to redissolve in water, depending upon the kind of resin system used in the ink, resulting in an increase in cylinder plugging and number of press wash ups. Conversely, the resin system may not be sufficiently water resistant upon drying, and the ink may be easily smeared in the presence of moisture.

The substrate being printed upon strongly affects the performance of water-based inks. In applications such as printing on low surface tension film and publication gravure employing coated paper, organic solvent systems give superior performance at this time. Even with uncoated paper, water may cause dimensional distortion and curling.

The resin system used in water-based inks can give rise to poor dot spread and increased skipped dots. These problems may be difficult to overcome given the limited availability of resins for use in water-based systems. Accordingly, the adoption of a water-based system may require changes in gravure cylinder engravings, press operating and housekeeping procedures, and at higher press speeds, dryer modifications. The aqueous phase of water-based inks contains many additives such as surfactants and alcohol to reduce surface tension and to stabilize pigment-resin dispersions. Ammonia or other volatile amines are often added to aid in dissolving the resin. The effect of the aforementioned additives must be evaluated and if necessary, compensated for in the printing process.

Printing pastes for screen printing on textiles have been formulated based on oil-in-water emulsions. Uhl et al., U.S. Pat. No. 3,825,431, disclose defoamers which are particularly useful in such print paste emulsions. A printing ink emulsion for lithographic printing is disclosed by DeSanto, Jr. et al., U.S. Pat. No. 4,981,517. Instead of applying a separate aqueous and oil based ink coat to the printing plate, an emulsion is provided which is applied in a single-application-step process. The emulsion obviates the requirement of a water coat application to the non-image area of a printing plate to render that area ink repellent.

Other uses of emulsions in printing ink formulations are disclosed by Krishman et al., U.S. Pat. No. 5,098,478 and Carlick et al., U.S. Pat. No. 5,158,606. The rub resistance of an ink may be improved by incorporating an emulsion polymer into the composition. In Krishman et al., the ink is water-based, whereas Carlick et al. disclose an oil based composition having up to 15 wt. % of an emulsion polymer incorporated therein.

Poly(oxyalkylene) substituted colorants have been employed in aqueous pigment dispersions, Toyo ink Seizo K.K., Japanese Pat. No. 63[1989]-264674; in publication gravure printing inks, Schwartz et al., U.S. Pat. No. 5,062,894; and in aqueous ink compositions, Moore et al., U.S. Pat. No. 5,176,745. However, the use of poly(oxyalkylene) substituted colorants in an organic solvent and water emulsion is heretofore unknown.

Despite the extensive work in development of water-based ink formulations, there remains a strong need in the gravure printing industry for an ink having reduced VOC, which retains the performance standards of organic solvent based inks.

SUMMARY OF THE INVENTION

Therefore, one of the objects of the invention is to provide a printing ink having reduced VOC emissions.

Another object of the invention is to provide a printing ink useful in the gravure printing process.

Still another object of the invention is to provide an ink which is compatible with a wide variety of substrates.

Further objects of the invention include providing: an emulsifier which is also a colorant thereby affecting partial replacement of pigment with a poly(oxyalkylene) substituted colorant; a printing ink which retains the performance characteristics of organic solvent based formulations; an ink which is compatible with standard pigments and resins used in gravure printing; and an ink which is more economical, both from a raw material cost and emission control expense.

Accordingly, an ink composition suitable for gravure printing is provided having a colorant component of from 0.5 to 10 wt. % of a poly(oxyalkylene) substituted colorant based on the weight of the composition, and a vehicle, wherein the vehicle is an emulsion of a water immiscible organic solvent phase and an aqueous phase in a ratio of from 9:1 to 1:3, respectively. Emissions of VOC may be reduced by 10 to 75% employing the present ink composition.

In addition to meeting the aforementioned objectives, the invention has preferred features of a water-in-oil emulsion, resins which are soluble or dispersible in a water immiscible organic solvent phase, a reduction in VOC emissions of from 5% to 75% relative to standard organic solvent based gravure printing ink compositions while maintaining print density and acceptable viscosity, and, in the case of black inks, a blue poly(oxyalkylene) substituted colorant to provide a blue tint to the ink. The ink formulation meets the rigid requirements of gravure printing, e.g., tone scale density, gloss, rub resistance, flexibility and adhesion.

BRIEF DESCRIPTION OF THE DRAWING

The drawing is a side schematic view of a portion of a gravure printing apparatus.

DESCRIPTION OF THE PREFERRED EMBODIMENT OF THE INVENTION

Without limiting the scope of the invention, the preferred features are set forth below. Unless otherwise indicated, all parts, percentages and ratios are by weight.

In its broadest sense, the gravure ink composition of the present invention is made up of a colorant and a vehicle. The vehicle is a liquid carrier, which is an emulsion of a water immiscible organic solvent and water. The water replaces a significant portion of the organic compounds in the formula, usually volatile organic solvents, thereby reducing VOC emissions. The vehicle also contains a binder which adheres the colorant to the substrate being printed upon when the ink dries. Surprisingly, the performance of the ink is not appreciably affected by the presence of water, as an emulsion, in the formulation, especially with regard to tone scale density.

The colorant composition is selected from poly(oxyalkylene) substituted colorants, pigments and dyes, provided that the poly(oxyalkylene) substituted colorant makes up from 0.1 to 15 wt % of the ink composition, preferably 0.5 to 10 wt %, most preferably 1 to 7 wt %. The poly(oxyalkylene) substituent is believed to stabilize the emulsion by functioning as an emulsifier. However, unlike conventional emulsifiers, the poly(oxyalkylene) substituted colorant contributes to the color strength of the ink, and can be selected to provide a desired shade or tint to the ink. Additionally, the poly(oxyalkylene) substituted colorant has been found to improve gloss, reduce skip dots, enhance print smoothness and reduce the VOC content of the ink by providing a VOC free color source.

A wide variety of poly(oxyalkylene) substituted organic chromophores and their preparation are well known in the art. These materials can be characterized by an organic chromophore, and a straight or branched poly(oxyalkylene) substituent comprised of from 4–100 residues of $C_{2-4}$ alkylene oxides. The chromophore is covalently bonded to the poly(oxyalkylene) substituent by a linking group such as N, NR, O, S, $SO_2$, $SO_2N$, or $SO_2NR$, $CO_2$, CON or CONR, where R is H, $C_1$–$C_{12}$ alkyl, phenyl or benzyl. Preferably, the linking group is N, NR, O, $SO_2N$ or $SO_2NR$. Two poly(oxyalkylene) substituents may be bonded to the chromophore through a trivalent linking group. The number of poly(oxyalkylene) chains per chromophore may be from 1–6, preferably 1–4, most preferably 1 or 2.

In a preferred embodiment, the poly(oxyalkylene) substituents are primarily comprised of from 8 to 50, most preferably from 10 to 35, residues of ethylene oxide, propylene oxide or random and block copolymers thereof. Minor amounts of glycidol, butylene oxide and other compatible monomers may also be incorporated into the substituent.

A wide variety of organic chromogens are suitable for use in the present invention. Examples of useful chromogens include: nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine and indigoid chromophore groups. Of particular interest are azo, methine, triphenylmethanes, anthraquinone, and xanthene chromogens.

Synthesis of organic chromogens containing poly(oxyalkylene) substituents are disclosed in Kuhn, U.S. Pat. No. 3,157,633, Brendle, U.S. Pat. No. 4,167,510, Cross et al., U.S. Pat. No. 4,284,729, Baumgartner et al., U.S. Pat. No. 4,732,570, Moore et al., U.S. Pat. No. 5,176,745, Kluger et al., U.S. Pat. No. 5,240,464, and Barry, U.S. Pat. No. 5,250,708, all of which are incorporated by reference herein.

Also included in the scope of the present invention are poly(oxyalkylene) substituted colorants made by modifying pigment as disclosed in Schwartz et al., U.S. Pat. No. 4,468,255 and Schwartz et al., U.S. Pat. No. 5,062,894, incorporated by reference herein.

The precise identity of the end group of the poly(oxyalkylene) substituent is not believed to be critical insofar as the functioning of the colorant in the ink composition is concerned. For example, the end group may be selected from:

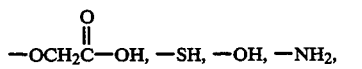

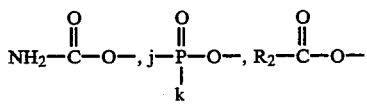

and sulfonates and sulfates of each of the members of said group, wherein $R_2$ is H, an alkyl radical containing up to about 20 carbon atoms or carboxy-terminated alkyl radical containing up to about 20 carbon atoms, j and k are OH, OM or $OR_3$, wherein M is a cation moiety of an alkali metal, an alkaline earth metal, transition metal, e.g., nickel, etc. or ammonium, and $R_3$ is an alkyl radical containing up to about 20 carbon atoms. In a preferred embodiment, the end group is —OH.

The solubility of the poly(oxyalkylene) substituted colorant may be varied by the relative hydrophilic-/oleophilic character of the poly(oxyalkylene) substituent and the end group, and the presence or absence of ionic groups on the colorant molecule.

In combination with the poly(oxyalkylene) substituted colorants, a wide variety of pigments and dyes may be employed. Pigments and their use in gravure ink compositions is well known to those skilled in the art. By way of example and not limitation, the following pigments may be used and are identified by Colour Index reference in Table 1 below.

TABLE 1

| PIGMENT NO. | C.I. NUMBER | NAME |
| --- | --- | --- |
| Yellow 12 | 21090 | Diarylide AAA |
| Yellow 13 | 21100 | Diarylide AAMX |
| Yellow 14 | 21095 | Diarylide AAOT |
| Yellow 17 | 21105 | Diarylide AAOA |
| Red 3 | 12120 | Toluidine Red |
| Red 49:1 | 15630 | Barium Lithol |
| Red 49:2 | 15630 | Calcium Lithol |
| Red 52:1 | 15860 | BON Calcium |
| Red 53:1 | 15585 | Lake Red C |
| Red 57:1 | 15850 | Rubine 4B |
| Blue 15 | 74160 | Phthalocyanine Blue |
| Blue 16 | 74100 | Phthalo Copper Free |
| Blue 18/56/61 | 42770/42800/42765:1 | Alkali Blue |
| Blue 24 | 42090:1 | Blue Lake |
| Blue 27 | 77510 | Iron Blue |
| Black 7 | 77266 | Carbon Black (Channel, Furnace and Lamp Black) |
| White 4 | 77947 | Zinc Oxide |
| White 6 | 77891 | Titanium Dioxide |
| White 18 | 77220 | Calcium Carbonate |
| White 24 | 77002 | Alumina Hydrate |
| White 27 | 77711 | Silica |

For purposes of the description herein, white pigments, clays, opacifiers and other pigment extenders are classified as pigments.

Suitable dyestuffs include, but are not limited to, Acid Dyes, such as Acid Red 87, C.I. Number 45380, Basic Dyes, such as Basic Violet 10, C.I. Number 45170, and Basic Blue 26, C.I. Number 44045, Solvent Dyes such as Solvent Yellow 19, C.I. Number 13900:1 and Solvent Black 7, C.I. Number 50415:1, and Disperse Dyes, such as Disperse Yellow 3, C.I. Number 11855 and Disperse Red 4, C.I. Number 60755.

The printability of the gravure ink composition is relatively insensitive to the pigment or dye which may be employed in combination with the poly(oxyalkylene) substituted colorant; the physical properties of the ink are primarily a function of the organic solvent and water emulsion.

The dispersion of pigments and dyestuffs into vehicles using mixing and milling techniques, including in the case of some dyestuffs, dissolution of the colorant into the vehicle, is a well known manufacturing process. It is important to note, however, that since the vehicle is an emulsion containing a water immiscible phase and an aqueous phase, it is advisable to first disperse the colorant in one or the other phase before forming the emulsion. From a practical standpoint, pigment and dye dispersions are available as a line ink, which is a concentrated, stabilized dispersion of the colorant in a water immiscible organic phase, typically a resin dissolved or dispersed in an organic solvent; the latter is generally referred to as a solution resinate or varnish. The line ink may be blended with additional varnish, organic solvent, and miscellaneous performance enhancing additives before it is mixed with the desired amount of water to form an emulsion.

The poly(oxyalkylene) substituted colorant may be added to the line ink, solvent, water, or to the emulsion. Preferably, the poly(oxyalkylene) substituted colorant will be added to the line ink.

The vehicle for the colorant is an emulsion of a water immiscible organic phase and an aqueous phase, and also includes a binder. Generally binders are resins described as non-crystalline solid materials, or liquids of a relatively high molecular weight, which adhere the colorant to a substrate when the ink dries. There are a wide variety of commercially available resins, and their selection and use is well known to practitioners in the field.

By way of example and not limitation, the following resins and mixtures thereof may be incorporated into the ink formulation:

rosin and modified rosins, such as calcium, magnesium and zinc metallic resinates, ester gum of rosin, maleic resins and esters, dimerized and polymerized rosins and rosin modified fumaric resins; shellac, asphalts, phenolic resins and rosin-modified phenolic resins; alkyd resins; polystyrene resins and copolymers thereof; terpene resins; alkylated urea formaldehyde resins; alkylated melamine formaldehyde resins; polyamide resins; polyimide resins; vinyl resins, such as polyvinyl acetate and polyvinyl alcohol; ketone resins; acrylic resins, such as polyacrylic acid and polymethacrylic acid; epoxide resins; polyurethane resins; cellulosic resins, such as nitro cellulose, ethyl cellulose, cellulose acetate butyrate and carboxymethyl cellulose.

The vehicle may also include a non-drying oil like Magic Oil 52, or a semi-drying oil or drying oil, such as linseed oil, Tung oil and oiticica oil, as a binder. These oils undergo oxidative polymerization upon drying to form an adhesive film for the colorant. Typically, these oils are provided in a modified form to enhance their drying time and film forming properties. Modification generally includes heat polymerization to form cyclic, dimers, trimers and some higher order polymers. Viscosities of these modified oils generally range from 1000 to 7500 centipoise at 25° C. and they have a density of about 0.96 grams per mL.

The resin may be soluble or dispersible in either the water immiscible phase or aqueous phase of the emulsion, depending on the resins hydrophobic/hydrophilic character. In a preferred embodiment, the resin is soluble in the water immiscible phase.

Appreciable reductions in VOC emissions may be realized with ratios of the water immiscible organic solvent phase to the aqueous phase as high as 19:1. More significant VOC reductions are achieved with ratios of the organic solvent phase to aqueous phase in the range of 9:1 to 1:3; preferably 9:1 to 1:1. Organic solvent reductions in the range of 4:1 to 1.1:1, preferably 3:1 to 1.5:1 are believed to represent optimizations of solvent reduction and printing ink performance. The weight ratios are calculated on a total solvent basis. Preferably, the emulsion is a water-in-oil emulsion.

Any of a large number of organic solvents, alone or in combination, may constitute the water immiscible phase of the emulsion. By way of example, the organic solvent may be selected from aliphatic, naphthenic and aromatic hydrocarbons, water immiscible alcohols, ketones, ethers and esters, drying and semi-drying oils, and halogenated organic solvents. Preferred organic solvents include:

(i) aromatic hydrocarbons having a single ring and a boiling point from 75° to 140° C.;

(ii) aliphatic and cycloaliphatic hydrocarbons having a boiling point from 60° to 340° C.;

(iii) esters of aliphatic acid having a boiling point from 65° to 175° C.;

(iv) ketones having a boiling point from 75° to 180° C.;

(v) alcohols having a boiling point from 100° to 260° C.;

(vi) ethers having a boiling point from 100° to 210° C.;

(vii) any of the organic solvents from groups (i) to (vi) above substituted with from 1 to 4 chloro or bromo substituents, and which have a boiling point of from 40° to 100° C.; and (viii) modified drying and semi-drying oils.

Except for drying oils listed above, preferably the organic solvents are $C_3$ to $C_{40}$ compounds. The water immiscible organic solvents have a solubility of less than one part per 100 parts of water.

By way of example, not limitation, specific examples of organic solvents include toluene, xylene, $C_5$ to $C_{40}$ aliphatic and cycloaliphatic hydrocarbons, 1,1,1-trichloroethane, methylene chloride. Tradenames for commercially available solvents include Textile Spirits TM, Lactol Spirits TM, Lacolene TM, Rotosolve TM, and VM&P Naphtha.

The aqueous phase of the vehicle may also include minor amounts of water miscible, organic solvents, such as methanol, without deviating from the performance of the ink composition.

The water immiscible phase may be emulsified with the aqueous phase in the aforementioned ratios by the mechanical energy imparted by, for example, pumping the components together in the ink reservoir of a standard gravure printing press for approximately five (5) minutes. Emulsifiers, such as nonionic surfactants, may be added to increase the stability of the emulsion. Generally, the emulsion will remain stable during printing by circulation of the ink composition in the printing well and, optionally, the pan in which the engraved gravure roll is immersed during the printing process. Propeller mixers may be inserted into the well to increase agitation and ensure a uniform distribution of the components in the ink composition.

It is also well known in the art to incorporate miscellaneous additives into the ink composition to enhance performance with regard to gloss, rub resistance, uniform density of the print, flexibility and adhesion. These additives include plasticisers such as sucrose acetate iso-butyrate, triethyl citrate, and epoxidised soy bean oil, and waxes such as polyethylene waxes, halogenated hydrocarbon waxes and fatty acid amides. In lesser amounts, additives such as surfactants, defoaming agents, catalysts, antioxidants, corrosion inhibitors, biocides and deodorants may be incorporated into the ink composition.

Ink compositions may be made according to the present invention having the following components:

(a) 2–25 parts colorant selected from poly(oxyalkylene) substituted colorants, pigments and dyes, provided that the poly(oxyalkylene) substituted colorants make up from 0.1 to 15 parts of the ink composition;

(b) 5–35 parts resins;

(c) 50–93 parts emulsion (resin-free basis); and (d) up to 15 parts miscellaneous additives.

In a preferred embodiment, the ink has the following composition:

(a) 3–20 parts colorant selected from poly(oxyalkylene) substituted colorants, pigments and dyes, provided that the poly(oxyalkylene) substituent makes up from 0.5 to 10 parts of the ink composition;

(b) 7–30 parts resin;

(c) 60–90 parts emulsion (resin-free basis); and (d) up to 12 parts miscellaneous additives.

The viscosity of the ink composition when used for gravure printing is generally between 14 seconds and 90 seconds at 25° C. by Shell Cup #2, preferably between 16 seconds and 50 seconds at 25° C. (the word "seconds" shall hereinafter be referred to as "s"). These inks, however, can be used at temperatures ranging from 20° C. to 75° C., and accordingly, compositions having a viscosity of 14s to 90s by Shell Cup #2 at any temperature over that range are intended to be included within the scope of the invention. The viscosity requirements of Gravure inks dramatically distinguish them from paste-like inks, such as lithographic inks.

Referring to the drawing, an engraved gravure roll 1 is partially immersed in pan 2 filled with ink 3. As gravure roll 1 rotates, cells 4 pick up ink 3. Doctor blade 5 scrapes excess ink from the unengraved areas. A substrate such as paper 6 is fed between impression roller 7 and gravure roll 1, transferring ink 3 from cell 4 to the substrate. Backing roller 8 supports impression roller 7.

The invention may be further understood by reference to the following examples, but the invention is not to be construed as being unduly limited thereby.

All of the line inks and extender varnish used in Examples 1–10 were obtained from Flint Ink Corporation, Detroit, Mich., U.S.A.

The ink compositions of Examples 1–6 were prepared in the laboratory and printed on a K-proofer, Model Number K.C.C. 101 bench scale printer, available from RK Print Coat Instruments Ltd., which simulates gravure printing.

The following examples demonstrate use of the ink composition for gravure printing on a coated paper.

EXAMPLE 1

(Organic Solvent-based Formulation)

Thirty parts of a black line ink, DS-441, was added to a beaker. Next 25 parts of extender varnish, DS-914, and 32 parts of toluene were added to the mixture. The mixture was shaken for approximately five minutes. The ink composition was used to print monotone black.

EXAMPLE 2

(Emulsion-based Formulation)

Twenty-eight parts of toluene was added to a beaker. Next, 10 parts of water was added. Three parts of a mixture of a blue poly(oxyalkylene) substituted colorant identified as ethoxylated, propoxylated, $\alpha$, $\alpha'$, $\alpha''$, $\alpha'''$-(2-sulfophenyl) methyliumylidene] bis(4,1-phenylenenitrilo-di-2,1-ethanediyl)] tetrakis [$\alpha$-hydroxy] chloride, monosodium salt having approximately 2–14 moles of ethylene oxide, 7–20 moles propylene oxide, and an average molecular weight of 2000, and a purple poly(oxyalkylene) substituted colorant identified as a 50/50 blend of poly(oxy-1,2-ethanediyl), $\alpha$, $\alpha'$-[[[4-[(2,4-dinitro)azo-]phenyl]imine] di-2,1-ethanediyl] bis[$\alpha$-hydroxy], having 2–14 moles of ethylene oxide, 4–16 moles of propylene oxide, and an average mole weight of 1200, and poly(oxy-1,2-ethanedipl), $\alpha$, $\alpha'$-[[[4-[2,6-dichloro-4-nitro) azo]-phenyl] imine] di-2,1-ethanediyl] bis[[$\alpha$-hydroxy], having 2–14 moles ethylene oxide, 4–16 moles propylene oxide and an average molecular weight of 1250. This was added and the mixture was emulsified by shaking it vigorously. Next 21 parts of a black line ink, DS-441, was added followed by 25 parts of extender varnish, DS-914. The entire mixture was shaken and the ink composition was used to print monotone black on coated paper.

EXAMPLE 3

(Emulsion-based Formulation)

Twenty-one parts of toluene was added to a beaker. Next, 21 parts of water was added. Three parts of a mixture of the blue poly(oxyalkylene) substituted colorant and the purple poly(oxyalkylene) substituted colorant described in Example 2 was added and the mixture was emulsified by shaking vigorously for five minutes. Then 17 parts of a black line ink, DS-441, was added followed by 25 parts of extender varnish DS-914. The entire mixture was shaken and the ink composition was used to print monotone black on coated paper.

The compositions of the ink formulations of Example 1–3 are summarized below based upon weight percentages of dry pigment, dry resin, water immiscible organic solvent, water and miscellaneous additives. The resin was a rosin based, metal resinate and the organic solvent is substantially toluene or mixtures of toluene and xylene.

Tonal densities of the printed ink were measured using an X-Rite, Inc. 938 model spectrodensitometer and the results are summarized below in Table 2.

TABLE 2

| EXAMPLE | 100 | 75 | 50 | 25 |
|---|---|---|---|---|
| 1 | 1.296 | 1.050 | 0.513 | 0.093 |
| 2 | 1.290 | 1.028 | 0.500 | 0.062 |
| 3 | 1.273 | 1.092 | 0.505 | 0.061 |

The following examples demonstrate the use of the ink composition for Gravure printing on uncoated paper.

EXAMPLE 4

(Organic Solvent-based Formulation)

Thirty parts of a black line ink, DS-441, was added to a beaker. Next 25 parts of extender varnish, DS-914, and 32 parts of toluene were added to the mixture. The ink composition was mixed for about 5 minutes and then used to print monotone black on 30 lb uncoated paper.

EXAMPLE 5

(Emulsion-based Formulation)

Eighteen parts of toluene was added to a beaker. Next, 6.4 parts of water was added. Next 3 parts of mixture of a blue polymeric colorant and a purple poly(oxyalkylene) substituted colorant described in Example 2 was added to and the mixture was emulsified by shaking vigorously for five minutes. Then 27 parts of a black line ink, DS-441 was added followed by 25 parts of extender varnish, DS-914. The entire mixture was shaken and the ink composition was used to print monotone black on 30 lb uncoated paper.

EXAMPLE 6

(Emulsion-based Formulation)

Eighteen parts of toluene was added to a beaker. Next, 27.0 parts of water was added. Three parts of a mixture of a blue poly(oxyalkylene) substituted colorant and a purple poly(oxyalkylene) substituted colorant described in Example 2 was added and the mixture was emulsified by shaking it vigorously. Next, 30 parts of a black line ink, DS-441, was added followed by 25.0 parts of extender varnish DS-914. The entire mixture was shaken and the ink composition was used to print monotone black on 30 lb. uncoated paper.

The calculated ink formulations of Examples 4–6 and the tonal density measurements of the printed ink on uncoated paper are summarized in Tables 3 and 4 below, respectively.

TABLE 1

| EXAMPLE | % PIG. | % RESIN | % ORGANIC SOLVENT | % WATER | % ADDITV. | % POLYMER COLORANT |
|---|---|---|---|---|---|---|
| 1 | 9.8 | 13.6 | 75.6 | — | 1.0 | 0.0 |
| 2 | 8.1 | 11.4 | 64.8 | 11.5 | 0.7 | 3.5 |
| 3 | 6.4 | 7.4 | 54.0 | 24.1 | 0.6 | 3.5 |

TABLE 3

| EXAMPLE | % PIG. | % RESIN | % ORGANIC SOLVENT | % WATER | % ADDITV. | % POLYMER COLORANT |
|---|---|---|---|---|---|---|
| 4 | 9.8 | 13.6 | 75.6 | — | 1.0 | 0.0 |
| 5 | 10.1 | 14.1 | 62.9 | 8.1 | 1.0 | 3.8 |
| 6 | 8.3 | 11.5 | 50.2 | 26.2 | 0.9 | 2.9 |

TABLE 4

| EXAMPLE | 100 | 75 | 50 | 25 |
| --- | --- | --- | --- | --- |
| 4 | 1.179 | 1.021 | 0.531 | 0.165 |
| 5 | 1.335 | 1.052 | 0.579 | 0.196 |
| 6 | 1.242 | 1.055 | 0.627 | 0.222 |

The print of Examples 1-6 demonstrated good gloss, rub resistance, flexibility and adhesion to the substrate. The print of Examples 2-3 and 5-6 had a bluish tint, which is desirable for a black tone. Additionally, the emulsion based formula was comparable in quality to the print of Examples 1 and 4 (organic solvent based formula), while realizing a reduction of up to 50% in organic solvent.

The following examples were performed with a yellow line ink, DS-861, containing diarylide pigment Yellow 12 and a polymeric colorant, 2-cyano-3-(4'-bis-(hydroxyalkylpolyoxyalkylene) aminophenyl) 2-propenoic acid ethyl ester, having from 2 to 12 moles of ethylene oxide, 7 to 20 moles of propylene oxide and an average molecular weight of 1395.

EXAMPLE 7

(Organic Solvent-based Formulation)

Fifty-two and three-tenths (52.3) parts of yellow line ink DS-861 was added to a beaker. Next, 13.1 parts of extender varnish DS-914 was added. To this was added 34.6 parts of toluene to thin the ink to a printable viscosity. The entire mixture was then shaken and the ink was used to print monotone yellow on 32 lb. coated paper.

EXAMPLE 8

(Emulsion-based Formulation)

Fifty-three and one-tenth (53.1) parts of yellow line ink DS-861 was added to a beaker followed by 11.9 parts of extender varnish DS-914. To this was added 31.5 parts of toluene followed by 3.5 parts of water and the entire mixture was shaken vigorously to emulsify the ink mixture. The resulting ink composition was used to print monotone yellow in 32 lb. coated paper.

EXAMPLE 9

(Emulsion-based Formulation)

Fifty and three-tenths (50.3) parts of line ink DS-861 was added to a beaker, followed by 12.6 parts of extender varnish DS-914. To this was added 29.7 parts of toluene followed by 7.4 parts of water. The mixture was emulsified by shaking vigorously. The resulting ink composition was used to print monotone yellow on 32 lb. coated paper.

EXAMPLE 10

(Emulsion-based Formulation)

Fifty and three-tenths (50.3) parts of line ink DS-861 was added to a beaker, followed by 12.6 parts of extender varnish DS-914. To this was added 26 parts of toluene followed by 11.2 parts of water. The mixture was emulsified by shaking vigorously. The resulting ink composition was used to print monotone yellow on 32 lb. coated paper.

The calculated ink formulations of Examples 7-10 and the tonal density measurements (100% density only) and viscosity are summarized in Tables 5 and 6 below.

TABLE 5

| Examples | % Pigment | % Resin | % Organic | % Water | % Additives | % Polymer Colorant |
| --- | --- | --- | --- | --- | --- | --- |
| 7 | 4.0 | 16.3 | 76.2 | 0.0 | 1.6 | 2.1 |
| 8 | 5.7 | 16.2 | 72.8 | 3.5 | 1.6 | 2.1 |
| 9 | 3.8 | 15.6 | 70.0 | 7.4 | 1.5 | 2.0 |
| 10 | 3.8 | 15.6 | 66.0 | 11.2 | 1.5 | 2.0 |

TABLE 6

| Examples | 100% Density | Viscosity cps |
| --- | --- | --- |
| 7 | 1.09 | 22.3s |
| 8 | 1.05 | 19.7s |
| 9 | 1.05 | 24.0s |
| 10 | 1.09 | 30.8s |

The print of Examples 7-10 demonstrated good gloss, rub resistance, flexibility and adhesion to the substrate.

There are of course, many alternate embodiments and modifications which are intended to be included within the scope of the following claims.

What we claim is:

1. In a gravure printing process for transferring an ink composition to a substrate by contacting the substrate with a rotating engraved cylinder which is partially immersed in the ink composition, the ink composition including a colorant and a vehicle, the improvement comprising employing from 0.1 to 15 wt % of a poly(oxyalkylene) substituted colorant based on the weight of said composition and wherein said vehicle is an emulsion of a water immiscible organic solvent and water, said organic solvent and water being in a ratio of from 9:1 to 1:3 by weight, respectively.

2. The process of claim 1 wherein said emulsion is a water-in-oil emulsion and said organic solvent and water are present in a ratio of from 9:1 to 1:1 by weight, respectively.

3. The process of claim 2 wherein said poly(oxyalkylene) substituted colorant comprises from 4 to 200 residues selected from the group consisting of ethylene oxide and propylene oxide.

4. The process of claim 3 wherein said water immiscible organic solvent is selected from the group consisting of:
   (i) aromatic hydrocarbons having a single ring and a boiling point from 75° to 140° C.;
   (ii) aliphatic and cycloaliphatic hydrocarbons having a boiling point from 60° to 340° C.;
   (iii) esters of aliphatic acids having a boiling point from 65° to 175° C.;
   (iv) ketones having a boiling point from 75° to 180° C.;
   (v) alcohols having a boiling point from 100° to 260° C.
   (vi) ethers having a boiling point from 100° to 210° C.;
   (vii) said water immiscible organic solvents from groups (i) to (vi) which are substituted with from 1 to 4 chloro or bromo substituents, and which have a boiling point of from 40° to 100° C.; and (viii) modified drying and semi-drying oils; and wherein said ink composition has a viscosity of from 14s to 90s Shell Cup #2 at 25° C.

5. The process of claim 1 wherein said emulsion is a water-in-oil emulsion and said organic solvent and water are present in a ratio of from 3:1 to 1.5:1 by weight.

6. The process of claim 5 wherein said ink composition comprises from 1 to 7 wt % of said poly(oxyalkylene) substituted colorant having from 8 to 100 residues selected from the group consisting of ethylene oxide and propylene oxide and a chromogen selected from the group consisting of azo, methine, triphenylmethane, anthraquinone and xanthene chromogens.

7. The process of claim 6 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.; and
wherein said organic solvents of groups (i) to (vii) have between 3 and 40 carbon atoms per compound and wherein said ink composition has a viscosity of from 16s to 50s Shell Cup #2 at 25° C.

8. The process of claim 6 wherein said water immiscible organic solvent is selected from the group consisting of toluene, xylene, and $C_5$–$C_{40}$ aliphatic and cycloaliphatic hydrocarbons.

9. In a gravure printing process for transferring an ink composition to a substrate by contacting the substrate with a rotating engraved cylinder which is partially immersed in the ink composition, the improvement comprising employing an ink composition comprising by weight:
(a) 2–25 parts colorant selected from the group consisting of poly(oxyalkylene) substituted colorants, pigments and dyes, provided that said poly(oxyalkylene) substituted colorants constitute from 0.5 to 10 parts of said ink composition;
(b) 5–35 parts resins;
(c) 50–93 parts on a resin-free basis of an emulsion of a water immiscible organic solvent and water, said organic solvent and water being in a ratio of from 9:1 to 1:3 by weight, respectively; and
(d) up to 15 parts of additives.

10. The process of claim 9 wherein said emulsion is a water-in-oil emulsion and said organic solvent and water are present in a ratio of from 4:1 to 1.1:1 by weight, respectively.

11. The process of claim 10 wherein said poly(oxyalkylene) substituted colorant comprises from 4 to 200 residues selected from the group consisting of ethylene oxide and propylene oxide.

12. The process of claim 11 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.; and
(viii) modified drying and semi-drying oils; and wherein said ink composition has a viscosity of from 14s to 90s Shell Cup #2 at 25° C.

13. The process of claim 9 wherein said emulsion is a water-in-oil emulsion and said organic solvent and water are present in a ratio of from 3:1 to 1.5:1 by weight, respectively.

14. The process of claim 13 wherein said ink composition comprises from 1 to 7 wt % of said poly(oxyalkylene) substituted colorant having from 8 to 100 residues selected from the group consisting of ethylene oxide and propylene oxide and chromogen selected from the group consisting of azo, methine, triphenylmethane, anthraquinone and xanthene chromogens.

15. The process of claim 14 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.; and
wherein said organic solvents of groups (i) to (vii) have between 3 and 40 carbon atoms per compound and wherein said ink composition has a viscosity of from 16s to 50s Shell Cup #2 at 25° C.

16. The process of claim 14 wherein said water immiscible organic solvent is selected from the group consisting of toluene, xylene, and $C_5$–$C_{40}$ aliphatic and cycloaliphatic hydrocarbons.

* * * * *